Feb. 28, 1939.  J. F. SEITZ  2,148,508
METHOD AND MEANS FOR MAKING EFFECTS FOR MOTION PICTURES
Filed Nov. 1, 1933  2 Sheets-Sheet 1
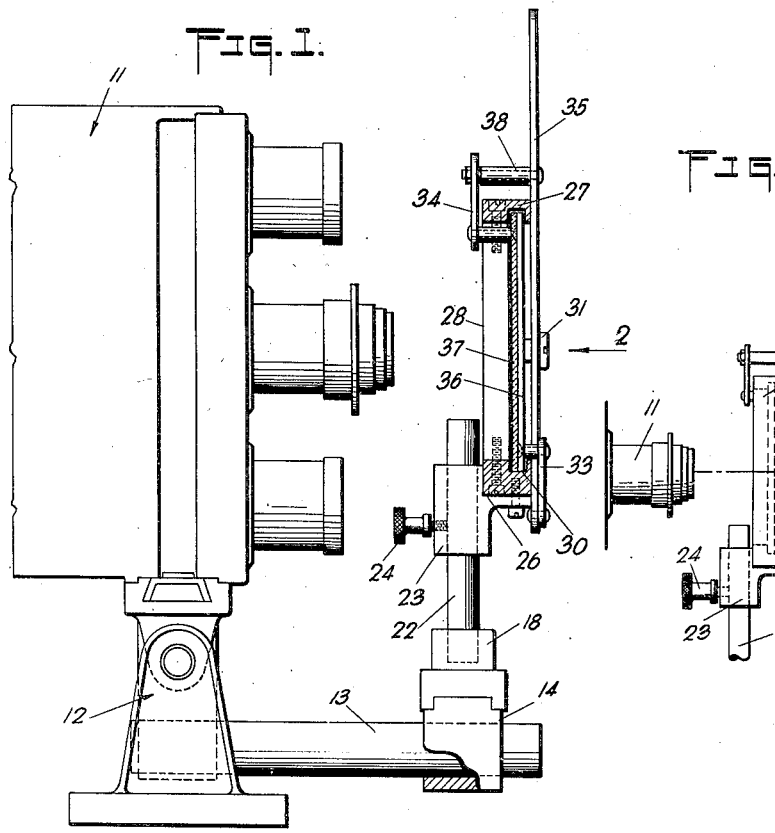
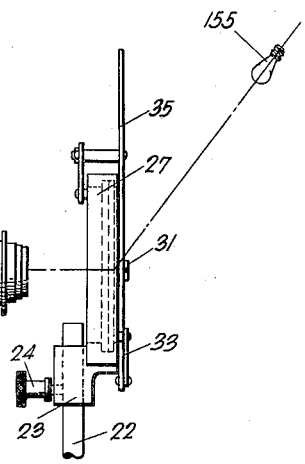
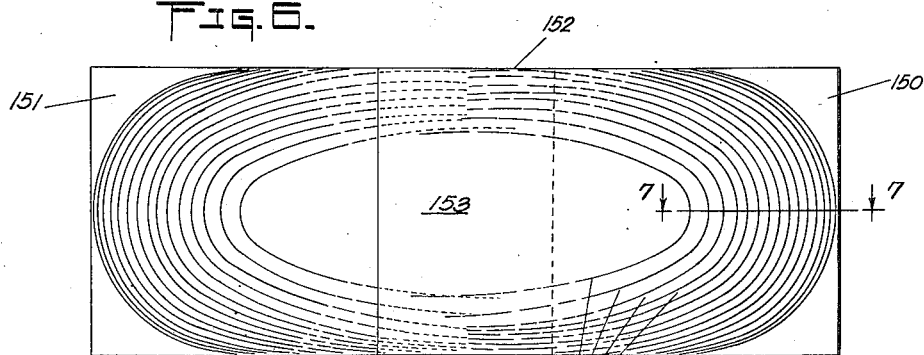
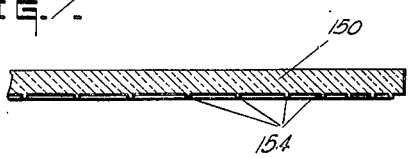
Inventor
JOHN F. SEITZ.
by Hazard and Miller
Attorneys.

Feb. 28, 1939. J. F. SEITZ 2,148,508
METHOD AND MEANS FOR MAKING EFFECTS FOR MOTION PICTURES
Filed Nov. 1, 1933 2 Sheets-Sheet 2
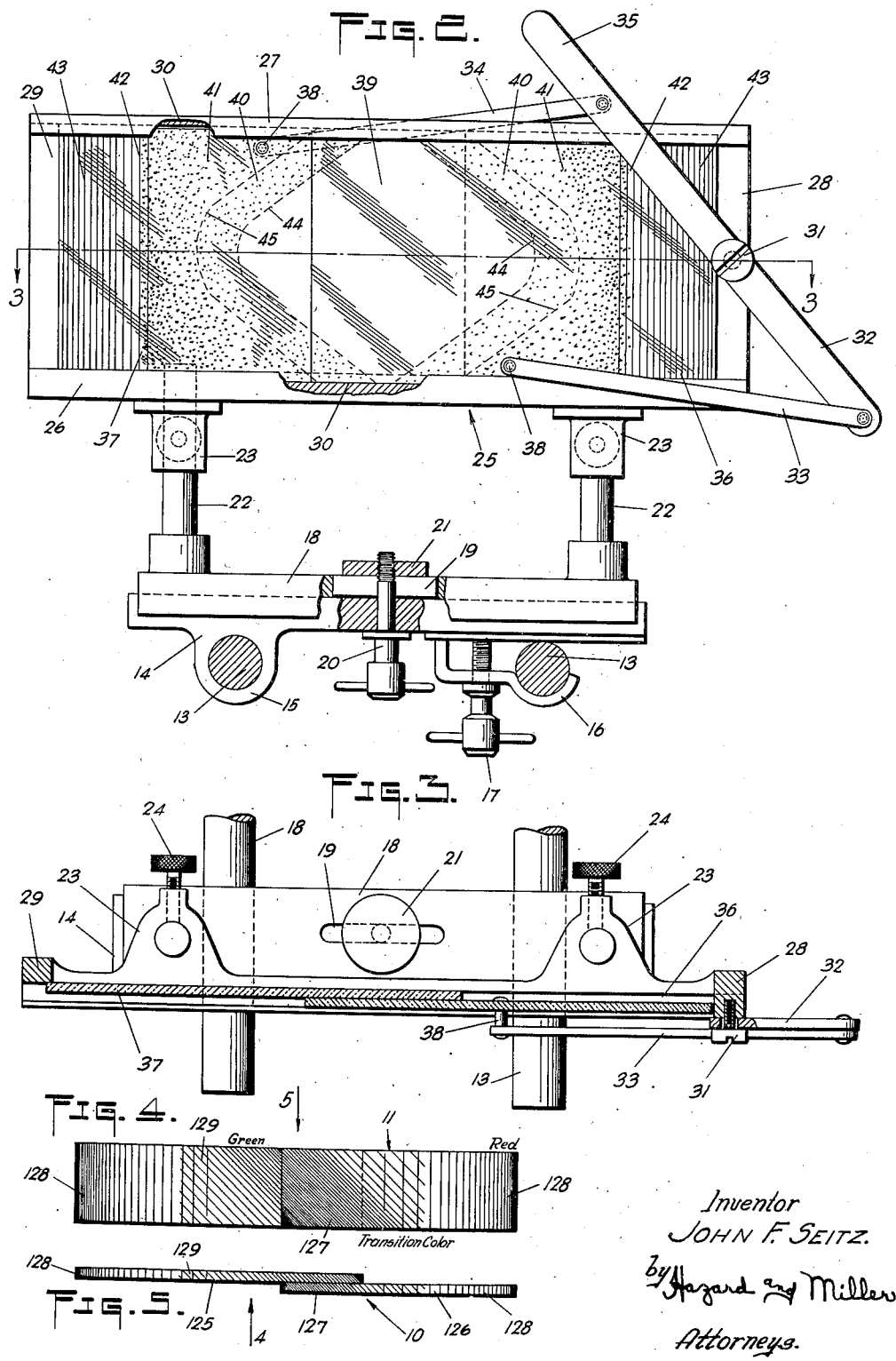

Patented Feb. 28, 1939

2,148,508

UNITED STATES PATENT OFFICE 2,148,508

METHOD AND MEANS FOR MAKING EFFECTS FOR MOTION PICTURES

John F. Seitz, Los Angeles, Calif.

Application November 1, 1933, Serial No. 696,187

14 Claims. (Cl. 88—16)

My invention relates to a method and apparatus for creating new transitional effects in motion pictures. By transitional effects I mean the change from one series of photographs to another series and employing a series of merging photographs in the transition to denote a lapse of time, change of location, and the like, in the screen story, somewhat analogous to but essentially different from the fade-out or overlapping dissolve.

Three distinct transitional effects are obtained by this invention: the diffusion transition, the envelopment transition, and the color transition. In the diffusion transition, starting with a clear, sharply focused image, the image is gradually diffused until it practically disappears in obscurity. This diffusion somewhat simulates viewing the object through increasing thicknesses and variations of gauze or veiling. Then, if desired, a second object may be photographed and its image gradually changed from practical obscurity through varying or lessening degrees of diffusion to clarity and sharpness.

The apparatus for obtaining these transitional effects may consist of glass plates or slides or a type of light filter. These diffusing slides may be gradually changed in character by, for instance, having a multitude of dots which from one edge of the slide or plate to the other become more dense, that is, the spaces between the dots decrease or else the dots increase in size or, as a different type, the diffusing slide or plates may have rulings of lines, these lines being opaque and either in graduated degrees becoming closer together or of greater width. In addition, transparent diffusion lines may be formed on the glass plates. These are preferably made in partial ovals merging to partially circular contours so that when two plates are overlapped on opposite sides the diffusion becomes more pronounced and when the plates are pulled apart a clearly transparent view of the object to be photographed may be obtained. Thus, when two overlapping plates are used as the diffusing medium and these plates are but slightly overlapped a clearly focused image will be obtained on the film of a moving picture camera but as the plates are overlapped to a greater amount the degree of diffusion becomes greater and the diffusion more pronounced until this is carried to an extent deemed satisfactory to the operator.

These transition effects are different from those produced by the procedure of my Patent 1,813,428 patented July 7, 1931, for Method and means for making dissolves and effects in motion pictures. In the procedure of the patent the image appears to disintegrate rather abruptly due to the action of the special lenses but in my present invention the clear and sharp lines of an image gradually become diffused or softened until such image is no longer distinguishable. Although my present procedure and that of my patent above mentioned are radically different they may be used one in conjunction with the other.

Another transitional effect obtained by my invention simulates an envelopment of the image. For instance, a clearly outlined image may be enveloped out of a series of photographs by using a medium or sliding plate operating between the objects photographed and the photographic lens of a camera in which such medium or plates produce a gradually increasing foglike effect. In this procedure clearly defined objects of one section of a picture appear to become enveloped as a fog until they disappear and then from this fog a second series of pictures may be enveloped in, this being a reverse procedure.

This foglike envelopment may be obtained by using a medium having, for instance, a pair of overlapping glass plates which plates are graduated from one edge to the other from a clear transparency to having ground glasslike characteristics. Thus, each plate changes in graduated amounts from a clear transparent section through varying degrees of translucency in which the image may be transmitted but with lesser definition until the plate is fully translucent and in which case no image can be transmitted. Thus, when a picture is photographed with the plates slightly overlapped a clearly defined image is obtained on the moving picture film but when the plates are gradually overlapped to greater degrees while the camera still operates the degrees of translucency change and thus the foglike envelopment of the image is obtained.

Transitional enveloping effects may also be obtained by photographing through a medium or screen in which a clear image may be obtained with the object to be photographed properly lighted, then the medium or screen may be illuminated by a light which gradually increases in intensity, the source of light being out of the field of the lens. As the medium itself becomes brilliantly lighted the light from the medium acts on the film to the exclusion of the image of the object on which the camera is focused. By this procedure, when the picture is projected, the image appears to become enveloped by an increasing intensity of light until the projection screen is so brilliant that the image is indistinguishable and appears to be enveloped in the brilliant light.

Another transition effect in making motion pictures and in the photography of such pictures is gradually changing the color value. For instance, one series of pictures may be taken through a color screen which will give certain photographic value in accordance with the color of light transmitted. The screen may then be moved and as the screen is graduated from one color to another it makes a gradual change in the color value of the light transmitted to the camera. For instance, the color screen may at one end be a red color and in another portion of a green color and graduated between the red and the green, for instance, having a red-orange, an orange and a yellow. Therefore, in moving the screen before the camera lens while the picture is being taken the light values may change through this red, red-orange, orange and yellow to the green. If desired the color screens may have three distinct primary colors with intermediate colors and shades between, somewhat like the spectrum of sunlight. For instance, the screen may be graduated from red at one end to blue or blue-violet at the opposite end and having orange, yellows and greens and bluish greens intermediate. While the color screens may be used effectively in black and white photography to illustrate changing aspects of the same object it is of value in color cinematography.

To obtain some of the effects I mount a pair of mediums in relation to the optical parts of a cinematographic apparatus and utilize these mediums in conjunction with the operation of such apparatus. For instance, the mediums may be formed of plate, such as glass, made optically plane on opposite sides, such glasses being mounted in a frame to slide in such a manner as to partly overlap and be slidable to overlap to a greater extent. The portions of the plates, when they are overlapped slightly and positioned in proper relation to the optical part of the cinematographic apparatus, would have pure transparency. This transparency gradually changes, progressing outwardly on the plates, and may become foggy, and, at the extreme outer part, translucent. Such effect may be produced by a ground or sanded glass which gradually works from the transparent to the translucent.

When such a device is used in connection with a cinematographic apparatus by first having the light pass through the transparent part and then gradually moving the plates until they overlap to a great extent, the object photographed is gradually obscured as in a fog, and it appears to be enveloped therein until it is entirely blocked out by the translucent part of the plates or medium. The translucent screen gives the effect of light on the cineograph, and such cineograph depicts the gradual change, due to the combined movement of the film and the screens or glass.

Another effect may be produced by having the medium formed of a pair of plates or screens overlapping and placed in proper relation to the optical part of a cinematographic apparatus. In this case when these plates are slightly overlapped, the center portion may be transparent and the outside portions changing from this to a dark obscuring section, and on the extreme outside be absolutely black or opaque. Then when such medium formed of the two screens is used and these are moved together to overlap to a greater extent, an effect is produced of objects being swallowed or being enveloped in darkness. The cineograph exhibits an intermediate stage between the pure transparency and the opacity; for example, may represent scenes or actions as they appear at dusk, the opacity giving a dark effect to the cineograph.

Another effect may be obtained by using the medium having screens or plates which are graduated in color, for instance, the two overlapping plates slightly overlapped in front of the optical part of a cinematographic apparatus may be green and transmit a green light. The extreme outside may be a red, transmitting only red light, and the portions in between gradually changing color from green to red. The effect produced with this type of medium, by moving the screens in and out to overlap to a greater or lesser extent, give certain desirable effects in color cinematography, and are also useful in giving effects in monochromatic photography. For example, it may be desired to obtain the effect of a scene changing from day to night. Presuming a building with windows is being photographed, also trees with foliage, when the green part of the screen is used in connection with the optical part of the cinematographic apparatus, the green light transmitted will give a daylight effect by showing the foliage relatively light in color. The building may appear darker, depending on its color, and the windows, if no light is directly reflected therefrom, will appear practically black.

Presuming there is artificial light in the building and the medium is shifted so that there is a gradual change from the green to the red, the effect produced by the red light would give a night effect, this being caused by the green foliage photographing dark or black, the building photographing a brighter color, and if there are artificial lights shining through the windows these will photograph bright.

Another type of effects may be produced by having the mediums formed of the two screen plates which, when slightly overlapped, are transparent and on the outside part give a diffused light, that is, allowing vision therethrough, but this vision is diffused by ribs, lines or the like, giving a prismatic effect to the passage of light, and such screens would be graduated from the pure transparency to the diffused section. When such screens are used and moved to a greater overlap, the scene will change from a clear, sharply defined picture, in accordance with the degree of sharpness of the lens of the cinematographic apparatus, to any desired degree of diffusion, and this may be regulated in speed at the will of the operator, having relation to the speed of the cinematographic apparatus. This is valuable for perambulator shots or variable focal length lenses when distance from the lens to the person or object being photographed is changed.

This application is a continuation, in part, of my application for Method and means for making effects for motion pictures, filed Oct. 10, 1927, Ser. No. 225,162.

My invention in its various aspects is illustrated in the accompanying drawings in which:

Fig. 1 is a vertical longitudinal section taken on the line 1—1 of Fig. 2 in the direction of the arrows.

Fig. 2 is a front elevation of the structure of Fig. 1 taken in the direction of the arrow 2 of such figure.

Fig. 3 is a horizontal section taken on the line 3—3 of Fig. 2 in the direction of the arrows.

Fig. 4 is a diagrammatic elevation of a pair of colored, transversely movable mediums, taken in the direction of the arrow 4 of Fig. 5 showing hatching.

Fig. 5 is a diagrammatic plan taken in the direction of the arrow 5 of Fig. 4.

Fig. 6 is an elevation of a medium having diffusing ribs or lines.

Fig. 7 is a section taken on the line 7—7 of

Fig. 6 in the direction of the arrows on an enlarged scale.

Fig. 8 is a diagram on a reduced scale similar to Fig. 1 showing the manner of diffusion by brilliant illumination of the diffusing medium.

Referring first to the construction shown in Figs. 1, 2 and 3: In this connection I show a moving picture camera designated generally by the numeral 11 having a supporting mounting 12. This mounting has a pair of supporting rods 13 extending outwardly therefrom. A base plate 14 has an opening 15 therethrough, in which one of the rods fits, and a clamp 16 tightened by a thumb-screw 17 to engage the other rod. A transversely slidable plate 18 is mounted on the plate 14 and has an adjustable connection by means of a slot 19 and a clamping screw 20 which extends upwardly through the base plate 14 has a nut 21 on the top. A pair of posts 22 extend upwardly from the plate 18 and have sleeves 23 thereon through which operate clamp screws 24.

These sleeves are connected to a guide frame designated generally by the numeral 25. This guide frame has a lower bar 26, an upper bar 27, and side bars 28 and 29. The upper and lower bars have guide grooves 30 therein. A pintle screw 31 is connected to the side 28 and has an operating lever 32 mounted thereon. This lever has a pair of links 33 and 34 connected thereto on opposite sides of the pintle 31, the free end 35 of the lever preferably extending upwardly above the bar 27. Each of these levers is connected to a medium 36 and 37 by pivot pins 38.

The mediums may be of various characters, and by the mounting above shown they are designed to overlap. In one form of the construction, for certain purposes, a center part 39 may be made transparent. Outside of this transparent part, there may be a portion 40 partly translucent, and a further outward part 41 denser than the part 40. The outside parts of each medium have sections 42 which may be somewhat opaque and beyond this there are sections 43 which are absolutely opaque to light. It is desirable to have the different translucent mediums 40 and 41 have more or less graduated lines 44 and 45 of angular formation so that when the mediums are drawn together a rectangle may be formed and this rectangle gradually contracted.

In order to give different effects I may have these mediums, screens, or glasses of, say, clear transparency, verging into sections which are slightly foggy or misty, but transmit light giving effect to the color values of such transmitted light. This may be utilized to give foggy effects as hereunder set forth, such effects gradually becoming denser or thinner, as desired.

In another arrangement I may utilize mediums such as screens or glasses which are of different colors, these colors being graduated in density so that the light transmitted is modified to a lesser or greater degree, in accordance with the manipulation of the said mediums, as hereunder set forth. Various other changes in the mediums will be obvious to those skilled in the art.

The manner of utilizing or operation of the various mediums such as screens or glasses is by rocking the lever 32 which draws the mediums together or separates them in varying degrees, so that, for instance, in the position shown, the center sections which are more or less transparent give a natural effect to the light transmitted, and by rocking the lever so that these mediums overlap to a greater extent the denser parts of the medium are brought into line with the camera lens so as to effect the light values transmitted through the medium. From this construction it is obvious that I may secure a multitude of different effects, depending on the type of mediums used, some of such types being outlined above.

In Figs. 4 and 5 I illustrate in a diagrammatic manner a pair of overlapping mediums 125 and 126, these being held in a suitable frame. In these I illustrate two distinct colors, for instance, at the center or overlapping portions of these mediums when they are drawn apart a green color is indicated at 127, whereas, at the outer or marginal portions a red color 128 is indicated. The green and the red color on each screen merge in a section 129. The merging of the green and the red should be such that this will give a pleasing effect. In the operation of these color mediums, for instance, the center section may be used giving a green color, then the mediums may be forced into greater overlap in which the colors will gradually change from the green through the intermediate tints 129 to the red, when the extreme outside portions of the mediums are in line with the lens. While I have illustrated two distinct colors on each screen and these merging together and have shown these as an illustration as green and red, it is obvious that other colors may be utilized and that these may also merge from one to another. Another way of obtaining the desired color effect is to have one screen of one color and another of another color but of varying degrees of intensity of color, then when these screens are overlapped to a lesser or greater degree, a marked change is obtained in the color of the light transmitted.

In Figs. 6 and 7 I illustrate types of diffusing or enveloping mediums in which diffusing ribs or lines form part of the mediums. In this case the two plates are indicated by the numerals 150 and 151, these having a central overlapping section 152 with a clearly transparent portion 153. Diffusion ribs or lines 154 are formed on the glass plates or slides. These are preferably somewhat oval shaped in the more central portions of the plates changing to the more or less circular curvature towards the outside edges. This is to get a better merging or diffusing effect when the overlap of the plates is increased. These plates are usually perfectly transparent and the ribs and lines are also transparent but such ribs or lines have a diffusing effect on the light giving a multitude of overlapping prismatic effects, thus the image is diffused without any great loss of light.

In Fig. 8 I illustrate in the diagram a procedure of diffusion by brilliancy of light. In this case I may use a mounting for the mediums such as illustrated in Fig. 1 and may use any suitable type of sliding mediums or plates or color screens as above described through which photographs of the objects or images may be obtained. When it is desired to make a transition by diffusion I illuminate the mediums, plates or screens by a bright source 155 which is located outside of the field of the lens of the camera. The intensity of light illuminating the diffusing medium is increased and as this becomes brilliantly illuminated the light transmitted through and reflected by the diffusing plates or screens registers on the photographic film giving substantially a complete exposure so that the image being photographed gradually disappears as the intensity of the illumination increases.

When a transition series of pictures are made by the procedure of Fig. 8 and projected on the screen the image appears to disappear or diffuse into the brilliant surrounding, the projection screen becoming brilliantly lighted on account of the film being subjected to the bright light illuminating the diffusing mediums.

In Figs. 6 and 7 the diffusion lines in the form of raised beads are somewhat similar in structure and function to the circular diffusion disks now used in photography to produce a certain amount of spherical aberration. Similar results may be obtained by molded lines in the glass depressed below the surface or if it is desired to use a multiplicity of dots these may be formed as transparent portions of the glass either raised above or depressed below the surface. The diffusion lines and dots apparently function to diffuse the light by the action of refraction. Where opaque graduated dots and lines are used the diffusing action apparently is a great deal due to the diffraction of light at the edges of the dots and lines.

The medium having the transparent diffusion lines or beads or the diffusion opaque dots or opaque lines is variable for reducing a diffusion in perambulator or other moving shots where in one instance a long view may be taken followed by a close-up, and in this close-up it is desirable to have a certain amount of diffusion.

I do not wish to be limited to any particular type or manner of making the various dots and/or lines such as indicated in Fig. 2 to give the various diffusion or transition effects. For instance, I may have dots which are translucent such as could be formed by sand blasting, and translucent lines could be formed by rulings cutting into the glass. Opaque dots could be made by small patches of opaque material and opaque lines could be formed by ruling with opaque materials. Transparent dots and lines could be formed by etching the glass, or could be moulded.

There is a law of optics that when light passes the edge of a dot or line, whether this is opaque or translucent, that such light is slightly diffracted. Therefore as there are a multiplicity of dots and/or lines, each of which produce a small diffraction area of light on the film, therefore the multiplicity of dots and/or lines, whether opaque or translucent, cause such a diffraction of the light reaching the film that the image becomes diffused. The rate of diffusion and the amount of this may be regulated and the diffusion may be obtained without substantially distorting the image.

Where the light passes through transparent dots and/or lines, the light is subject at each dot and/or line to a slight refraction, each giving an area of refracted light on the film. Therefore the multiplicity of dots and/or lines produces a multiplicity of refraction areas on the film and thus when the plates are gradually moved in their overlap the increasing total refraction diffuses the image and such diffusion may be controlled to the desired degree without substantial distortion of the image. Where the dots and/or lines are transparent, the total quantity of light reaching the film is substantially constant, whether the image is clear and distinct or diffused.

Various changes may be made by those skilled in the art in the details of construction without departing from the spirit or scope of my invention as defined by the appended claims.

I claim:

1. The method of making diffusing effects in cinematography, comprising rectilineally moving from a partial to a greater overlap of mediums graduated from transparency by dots or lines of increasing total area to opacity in opposite directions transversely in relation to an optical part of a cinematographic camera, and at the same time operating the camera, said mediums having the characteristic in one part of transmitting a clear, distinctly focused image by light passing through said mediums and in another part a gradually diffused image due in part to the diffraction of light whereby the image may be photographed with clear and distinct lines or gradually diffused until it disappears in a grey effect.

2. In the method of making diffusing effects in cinematography, comprising moving a plurality of mediums in opposite directions transversely in relation to an optical part of cinematographic camera and at the same time operating said camera, said mediums having the characteristic when in one position of transmitting a clearly focused image and when moved to a greater overlap gradually softening the image by slight refraction of light through the mediums, the degree of refraction increasing until the image is diffused to the desired degree, the total amount of light transmitted being substantially constant.

3. In the method of making diffusing effects in cinematography, comprising moving a plurality of mediums in opposite directions transversely in relation to an optical part of a cinematographic camera and at the same time operating such camera, said mediums having when partly overlapped a clearly transparent section merging with curved diffusion lines for slightly refracting the light, the increasing overlap of the mediums diffusing and softening the image by a slight refraction of the light until the desired diffusion is obtained, the total amount of light transmitted being substantially constant.

4. In the method of making transition effects in cinematography, comprising rectilineally moving from a partial to a greater overlap a plurality of mediums graduated from transparency to translucency in opposite directions transversely in relation to an optical part of a cinematographic camera and at the same time operating the camera, said mediums having a characteristic in one part of transmitting a clear image by light passing through said mediums and in another part having the characteristic of gradually changing the transparency whereby the clarity of the image is gradually diminished until it disappears as if enveloped in a fog.

5. In the method of making transition effects in cinematography as claimed in claim 4, illuminating the mediums by light of gradually increasing intensity from a source outside the field of a camera lens said medium having the characteristics of diffusing light into the camera and varying the exposure on the film.

6. In a device as described, a medium having a pair of overlapping plates, such plates being clearly transparent adjacent their overlapping edges, and each plate gradually decreasing in transparency from such edge toward the non-overlapping edges, there being a pronounced change in the transparency and such plates having V-shaped changes in diffusion density on each plate with the point of the V being toward the non-overlapped edges of the plates, means to give the plates a similar and simultaneous movement in translation in relation to each other to increase the overlap and thereby decrease the transparency materially from opposite sides, a cinematographic apparatus, means to mount said medium in the optical path of said apparatus for transmission of light through the plates for changing or diffusing the image formed by such apparatus during the overlapping movement of such plates and the operation of such apparatus.

7. In a device as described, a medium having a pair of overlapping plates, such plates being uncolored and clearly transparent adjacent their overlapping edges, each plate being graduated from transparency to transmit a clear image adjacent the overlapped edge to translucency to transmit a diffused image towards the non-overlapped edge, means to give the plates a similar and simultaneous movement in translation in relation to each other to increase the overlap and thereby decrease the transparency materially from opposite sides, a cinematographic camera, means to mount said medium in the optical path of said camera for transmission of light through the plates, said plates when partly overlapped having the characteristic of transmitting a clearly focused image and while being overlapped to a greater extent gradually decreasing the sharpness and increasing the softness of the image until it disappears as if enveloped in a fog, the said mediums having the further characteristic of transmitting substantially all the light incident thereon in all positions of the plate except such as is reflected by the plates.

8. In a device as described, a medium having a pair of overlapping plates, said plates being clearly transparent adjacent their overlapping edges and each graduated from transparency by means of increasing total area to opacity such as dots and/or lines toward the non-overlapping edge, means to give the plates a similar and simultaneous movement of translation in relation to each other to increase the overlap and thereby increase the degree of opacity from opposite sides, a cinematographic camera, means to mount said medium in the optical path of said camera for transmission of light through the plates, said plates when partly overlapped having the characteristic of transmitting a clearly focused image and while being overlapped to a greater extent gradually diffusing the image until it disappears in darkness.

9. In a device as described, a medium having a pair of overlapping plates, said plates being clearly transparent adjacent their overlapping edges and each graduated by curved diffusion lines, said lines being transparent, means to give the plates a similar and simultaneous movement in relation to each other to increase the overlap, a cinematographic camera, means to mount said medium in the path of said camera, said plates when partly overlapped having a characteristic of transmission a focused image and when overlapped to a greater extent gradually diffusing the image.

10. In a device as described, a moving picture camera having a lens and photographic film combined with a light transmitting medium, having the characteristic when directly intensely illuminated of diffusing light into the camera, means to position said medium in front of the camera lens and between the lens and an object to be photographed, said medium in all conditions of operation transmitting light with sufficient intensity and distinctness to form a clearly defined image of the object to be photographed on the film, a variable source of light outside the field of the camera positioned to illuminate the said medium to a sufficient intensity to cause the light from the medium to over-expose the film to such an extent as to gradually obscure the image of the object when the film is developed.

11. In the method of making diffusion effects in cinematography, comprising, focusing a camera through a transparent medium having the characteristic when directly intensely illuminated of diffusing light into the camera, on an object to be photographed whereby when desired an image of said object will be formed on the film operating the camera, first illuminating the medium by a source of light out of the field of the camera to such an intensity that the light from the medium exposes a first part of the film to such an extent that in development of the film no photograph of the object appears, next decreasing the illumination of the medium until the light from the object transmitted through the medium produces a photographic record on a second part of the film.

12. In combination with a cinematographic camera of an image diffusing medium in the optical path between an object to be photographed and the film of the camera, said medium consisting of a pair of overlapping plates in said optical path, means to simultaneously move said plates in opposite directions to change the overlap, each plate having a transparent portion through which when said transparent portions are in the optical path a clear and distinct image may be formed on the film, each plate having the characteristic of having a multiplicity of gradually increasing areas producing diffraction of light passing therethrough, whereby when the plates are moved from the position with the transparent portions in the optical path to positions with the diffraction areas in the optical path and the camera operated, the image becomes gradually diffused to the desired degree without substantial distortion.

13. In combination with a cinematographic camera, of an image diffusing medium in the optical path between an object to be photographed and the film of the camera, said medium consisting of a pair of overlapping plates in said optical path, means to simultaneously move said plates in opposite directions to change the overlap, each plate having a transparent portion through which when said transparent portions are in the optical path a clear and distinct image may be formed on the film, each plate having the characteristic of having a multiplicity of gradually increasing areas producing refraction of light passing therethrough, whereby when the plates are moved from the position with the transparent portions in the optical path to positions with the refraction areas in the optical path and the camera operated, the image becomes gradually diffused to the desired degree without substantial distortion, and while maintaining the total quantity of light transmitted to the film substantially constant.

14. The combination with a motion picture camera having a photographic lens, of a variable diffusion device adapted to induce diffusion when the motion picture camera is in operation, comprising two members each provided with a transparent area and with a diffusion area, said two members being in overlapped relationship, and mechanical means for positioning said diffusion device forwardly of the photographic lens, and mechanical means for simultaneously moving said overlapped members whereby said transparent or diffused areas may be conjointly presented forwardly of said lens in selected degrees to introduce aberration into the system.

JOHN F. SEITZ.